United States Patent
Ahmed et al.

(10) Patent No.: US 12,325,327 B2
(45) Date of Patent: Jun. 10, 2025

(54) ENERGY TRANSFER AMONG MISMATCHED BATTERY SYSTEMS

(71) Applicant: GM Global Technology Operations LLC, Detroit, MI (US)

(72) Inventors: Mohamed Ahmed Kamel Ahmed, Birmingham, MI (US); Lei Hao, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/310,768

(22) Filed: May 2, 2023

(65) Prior Publication Data

US 2024/0367549 A1 Nov. 7, 2024

(51) Int. Cl.
*B60L 58/22* (2019.01)
*B60L 53/62* (2019.01)
*H02J 7/34* (2006.01)

(52) U.S. Cl.
CPC ............... *B60L 58/22* (2019.02); *B60L 53/62* (2019.02); *H02J 7/342* (2020.01); *B60L 2210/10* (2013.01); *H02J 2207/20* (2020.01)

(58) Field of Classification Search
CPC ...... B60L 53/62; B60L 2210/10; H02J 7/342; H02J 2207/20
USPC .......................................................... 307/9.1
See application file for complete search history.

(56) References Cited

U.S. PATENT DOCUMENTS

| | | | | |
|---|---|---|---|---|
| 2005/0151509 | A1* | 7/2005 | Cook | B60R 16/033 320/116 |
| 2012/0139491 | A1* | 6/2012 | Eberhard | B60L 58/22 320/118 |
| 2015/0077039 | A1* | 3/2015 | Soong | B60L 53/30 320/107 |
| 2018/0056808 | A1* | 3/2018 | Gibson | H02J 7/0019 |
| 2019/0310321 | A1* | 10/2019 | Mi | H02J 7/0014 |
| 2021/0126471 | A1* | 4/2021 | Srivastava | H02J 7/0014 |
| 2022/0209546 | A1* | 6/2022 | Hall | H02J 7/00304 |

\* cited by examiner

*Primary Examiner* — Alfonso Perez Borroto
(74) *Attorney, Agent, or Firm* — CANTOR COLBURN LLP (57) ABSTRACT

An energy transfer system includes a conversion device configured for partial power processing and configured to regulate current from a first battery system, and a controller configured to control the conversion device to adjust a first voltage of the first battery system to conform the first voltage to a second voltage of a second battery system, the second battery system connected in parallel with the first battery system by a bus. The conversion device is configured to receive power from the first battery system, cause a selected portion of the power to flow through a conversion stage to adjust the first voltage, the selected portion corresponding to a difference between the first voltage and the second voltage, cause a remaining portion of the power to flow directly to the bus and bypass the conversion stage, and output a current from the conversion device at the second voltage.

20 Claims, 7 Drawing Sheets

ENERGY TRANSFER AMONG MISMATCHED BATTERY SYSTEMS

INTRODUCTION

The subject disclosure relates to energy or power transfer, and more particularly to systems and methods for controlling power transfer among energy storage systems having different parameters.

Vehicles, including gasoline and diesel powered vehicles, as well as electric and hybrid electric vehicles, feature battery storage for purposes such as powering electric motors, electronics and other vehicle subsystems. Battery assemblies may be charged using dedicated charging stations and other power sources such as residences and building connected to a power grid. In addition, some vehicles may have the capability to transfer power to external locations, such as by supplying power to battery assemblies of other vehicles and/or to a grid. Power transfer may be between or among battery systems that have different voltages. For example, when powering a load by parallel batteries having different voltages, conversion devices are used to adjust at least one battery voltage. Conversion devices are also utilized in charging processes in which donor and/or recipient battery systems may have different voltages.

SUMMARY

In one exemplary embodiment, an energy transfer system includes a conversion device configured to be electrically connected to a first battery system of a first vehicle, the conversion device configured for partial power processing and configured to regulate current from the first battery system, and a controller configured to control the conversion device to adjust a first voltage of the first battery system to conform the first voltage to a second voltage of a second battery system, the second battery system connected in parallel with the first battery system by a bus. The conversion device is configured to receive power from the first battery system, cause a selected portion of the power to flow through a conversion stage to adjust the first voltage, the selected portion corresponding to a difference between the first voltage and the second voltage, cause a remaining portion of the power to flow directly to the bus and bypass the conversion stage, and output a current from the conversion device at the second voltage.

In addition to one or more of the features described herein, the conversion device is an isolated DC-DC converter.

In addition to one or more of the features described herein, the conversion device is a non-isolated inverting DC-DC converter.

In addition to one or more of the features described herein, the conversion device includes a DC-DC converter configured to provide a variable voltage to an inverter for control of an electric motor of the first vehicle.

In addition to one or more of the features described herein, the conversion device is disposed in a portable adapter configured to be connected to the first vehicle and a recipient vehicle for vehicle-to-vehicle (V2V) charging.

In addition to one or more of the features described herein, the second battery system is a power source of a vehicle charging system, the vehicle charging system including a common charging bus that is configured to connect multiple vehicles in parallel to the power source to simultaneously charge the multiple vehicles.

In addition to one or more of the features described herein, the conversion device is disposed in the first vehicle and is configured to be connected to the vehicle charging system via a charge port.

In addition to one or more of the features described herein, the conversion device includes a plurality of conversion devices, each of the plurality of conversion devices disposed in a respective charging port of the charging system.

In another exemplary embodiment, a method of control of energy transfer includes connecting a first battery system of a first vehicle to a load or an energy storage system, the first battery system electrically connected to a conversion device configured for partial power processing and configured to regulate current from the first battery system, the first battery system connected in parallel with a second battery system to a bus, and controlling the conversion device to adjust a first voltage of the first battery system to conform the first voltage to a second voltage of the second battery system. The controlling includes receiving power from the first battery system, causing a selected portion of the power to flow through a conversion stage to adjust the first voltage, the selected portion corresponding to a difference between the first voltage and the second voltage, causing a remaining portion of the power to flow directly to the bus and bypass the conversion stage, and outputting a current from the conversion device at the second voltage.

In addition to one or more of the features described herein, the conversion device is an isolated DC-DC converter or a non-isolated inverting DC-DC converter.

In addition to one or more of the features described herein, the conversion device includes a DC-DC converter configured to provide a variable voltage to an inverter for control of an electric motor of the first vehicle.

In addition to one or more of the features described herein, the conversion device is disposed in a portable adapter connected to the first vehicle and a recipient vehicle for vehicle-to-vehicle (V2V) charging, and the second voltage is a voltage of a recipient battery system of the recipient vehicle.

In addition to one or more of the features described herein, the second battery system is a power source of a vehicle charging system, the vehicle charging system including a common charging bus that is configured to connect multiple vehicles in parallel to the power source to simultaneously charge the multiple vehicles.

In addition to one or more of the features described herein, the conversion device is disposed in the first vehicle and is connected to the vehicle charging system via a charge port.

In addition to one or more of the features described herein, the conversion device includes a plurality of conversion devices, each of the plurality of conversion devices disposed in a respective charging port of the vehicle charging system.

In yet another exemplary embodiment, a vehicle system includes a first battery system of a first vehicle, a conversion device electrically connected to the first battery system, the conversion device configured for partial power processing and configured to regulate current from the first battery system, the first battery system connected in parallel with a second battery system to a bus, and a controller configured to control the conversion device to adjust a first voltage of the first battery system to conform the first voltage to a second voltage of the second battery system. The control of the conversion device includes receiving power from the first battery system, causing a selected portion of the power to flow through a conversion stage to adjust the first voltage, the selected portion corresponding to a difference between the first voltage and the second voltage, causing a remaining portion of the power to flow directly to the bus and bypass the conversion stage, and outputting a current from the conversion device at the second voltage.

In addition to one or more of the features described herein, the conversion device is an isolated DC-DC converter or a non-isolated inverting DC-DC converter.

In addition to one or more of the features described herein, the conversion device includes a DC-DC converter configured to provide a variable voltage to an inverter for control of an electric motor of the first vehicle.

In addition to one or more of the features described herein, the conversion device is disposed in a portable adapter connected to the first vehicle and a recipient vehicle for vehicle-to-vehicle (V2V) charging, and the second voltage is a voltage of a recipient battery system of the recipient vehicle.

In addition to one or more of the features described herein, the second battery system is a power source of a vehicle charging system, the vehicle charging system including a common charging bus that is configured to connect multiple vehicles in parallel to the power source to simultaneously charge the multiple vehicles.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for controlling power flow among battery systems having different parameters, characteristics or states. The power flow may be among different battery packs or battery assemblies within a vehicle, and/or power flow between a vehicle and an external energy storage system (e.g., a battery system of another vehicle, a power grid or charging station). In an embodiment, the external energy storage system is a battery of another vehicle (a recipient vehicle).

An energy transfer system includes a conversion device configured to be operated to adjust a voltage of a battery system when the battery system is connected in parallel to another battery system having a different voltage. Battery systems may have different voltages due to differences in various battery parameters, such as voltage rating, chemistry, state of charge, capacity, state of health, form factor, mass and/or volume.

The conversion device, in an embodiment, is a partial power processing conversion device, which is configured to process (e.g., step up or step down voltage) a portion or fraction of the energy exchanged between mismatched battery systems connected in parallel (e.g., connected by a vehicle power bus or connected for charging). In this way, the different voltages are decoupled from a common bus. The conversion device may be a partial power direct current (DC)-DC converter.

The conversion device is connected to a first battery system, and is configured to process a portion of the total power output of the first battery system. The portion corresponds to a difference between a voltage of the first battery system and a voltage of a second battery system or common bus. The remaining power is not processed, but rather bypasses conversion stages of the conversion device. This partial power processing reduces the amount of energy that flows through the conversion stages, and thereby reduces losses due to switching and increases efficiency.

Embodiments also include systems for controlling charging between mismatched battery systems and/or controlling charging of mismatched battery systems connected to a common charger (e.g., a charger of a charging station that can be selectively connected to multiple battery systems for simultaneous charging).

Embodiments described herein present numerous advantages and technical effects. For example, the embodiments provide for improved efficiency in supplying power from mismatched batteries by reducing the amount of power that flows through conversion stages. Switching devices in such conversion stages cause power loss, which reduces efficiency. By reducing the amount of power subject to conversion, power losses are reduced.

The embodiments are not limited to use with any specific vehicle or device or system that utilizes battery assemblies, and may be applicable to various contexts. For example, embodiments may be used with automobiles, trucks, aircraft, construction equipment, farm equipment, automated factory equipment and/or any other device or system that may use high voltage battery packs or other battery assemblies.

Figure 1:
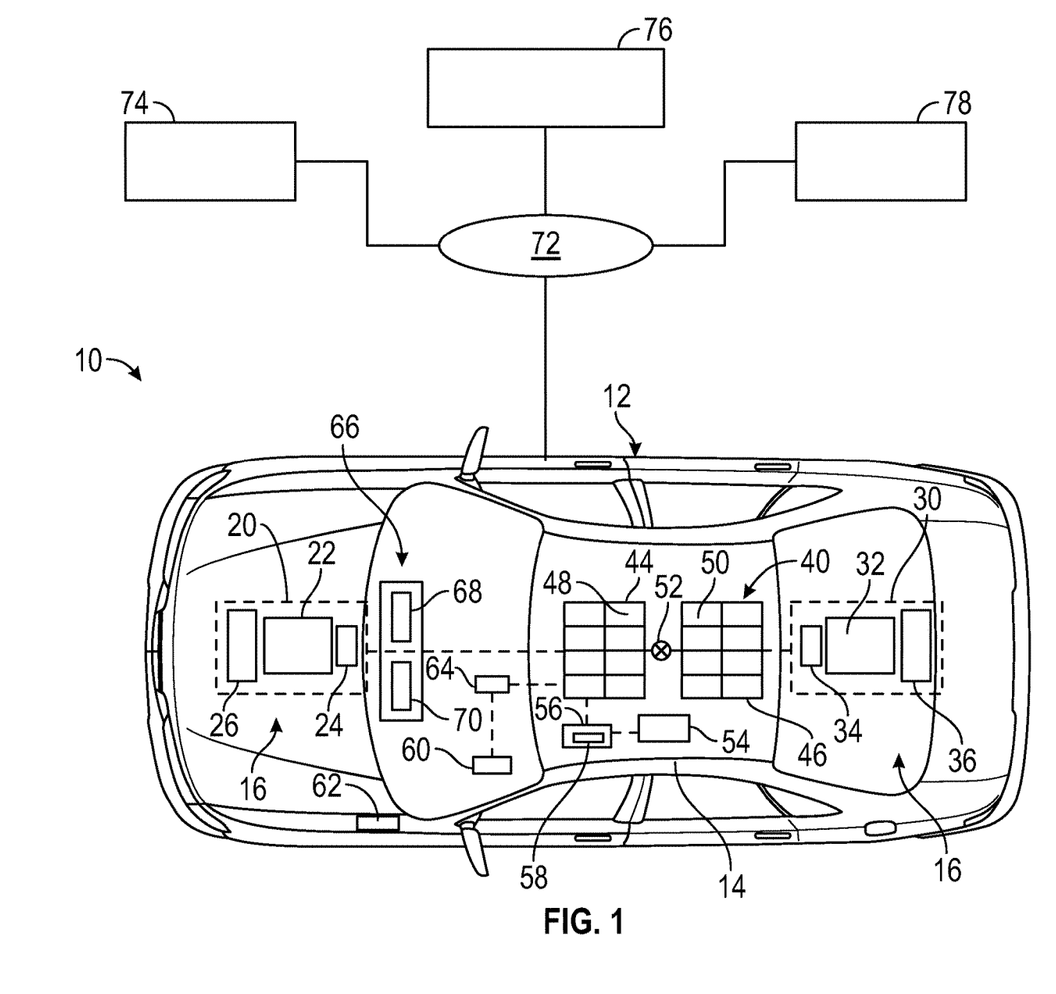
FIG. 1 is a top schematic view of a motor vehicle including a battery system and an energy transfer control system, in accordance with an exemplary embodiment.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle. In an embodiment, the vehicle 10 is an electric vehicle, which includes one or more motors and one or more drive systems. For example, the propulsion system 16 is a multi-drive system that includes a first drive unit 20 and a second drive unit 30. The first drive unit 20 includes a first electric motor 22 and a first inverter 24, as well as other components such as a cooling system 26. The second drive unit 30 includes a second electric motor 32 and a second inverter 34, and other components such as a cooling system 36. The inverters 24 and 34 (e.g., traction power inverter units or TPIMs) each convert direct current (DC) power from a high voltage (HV) battery system 40 to poly-phase (e.g., two-phase, three-phase, six-phase, etc.) alternating current (AC) power to drive the motors 22 and 32.

In the propulsion system 16, the drive unit 20 and the drive unit 30 are electrically connected to the battery system 40. The battery system 40 may be configured as a rechargeable energy storage system (RESS).

The battery system 40 includes one or more battery assemblies. For example, the battery system 40 includes one or more high voltage battery packs, such as a first battery pack 44 connected to the inverter 24, and a second battery pack 46 connected to the inverter 34. The battery pack 44 includes a plurality of battery modules 48, and the battery pack 46 includes a plurality of battery modules 50. Each module 48, 50 includes a number of individual cells (not shown). In an embodiment, the battery packs 44 and 46 can be independently charged and can be used to independently supply power for propulsion, power supply and/or charging.

The battery system 40 can be configured to provide different output voltage levels. For example, a battery switching device 52 is included for selectively connecting the battery pack 44 to the battery pack 46 in series to provide a relatively high voltage (e.g., 800V). The battery switching device 52 can also be operated to connect the battery packs in parallel to provide a relatively low voltage (e.g., 400 V).

The battery system 40 may be electrically connected to other components, such as vehicle electronics and/or other battery systems. The vehicle 10 may include battery systems that have different voltage ratings, capacities and/or chemistries. Examples of chemistries include lithium-ion chemistries (e.g., Lithium Cobalt Oxide (LCO) or Lithium Nickle Cobalt Oxide (NCA)), nickel-cobalt-manganese (NCM), lead-acid and others.

For example, the vehicle 10 includes at least one low voltage battery system including a low voltage (LV) battery 54 (e.g., a 12 Volt (V) battery pack). Power supply from the battery system 40 to the LV battery 54 and/or other components is controlled via a control device 56, such as an auxiliary power module (APM). The control device 56 includes a conversion device 58 configured to control or adjust voltage.

The vehicle 10 also includes a charging system, which can be used to charge the battery system 40 and/or to supply power from the battery system 40 to charge another energy storage system (e.g., vehicle-to-vehicle (V2V) and/or vehicle-to-everything (V2X) charging). The charging system includes one or more conversion devices for controlling aspects of charging and/or discharging. For example, at least one conversion device provides for conversion between AC current and DC current and/or voltage control. The conversion device may be a bi-directional conversion device that allows a charge port to be used for either charging or discharging.

In an embodiment, the charging system includes a charging control device 60, such as an onboard charging module (OBCM). The charging control device 60 includes a conversion device in the form of a charger (charge circuit) that includes devices for alternating current (AC)-DC conversion and DC-DC conversion. For example, the charging control device 60 includes a bi-directional charger that permits both charging the battery system 40 and discharging the battery system 40 to supply charge to an external power storage device, such as the battery system of another vehicle (V2V charging). The charging control device 60 connects the battery system to a charge port 62 for charging vehicle battery systems and/or providing charge to external storage systems.

The vehicle 10 includes at least one processor or processing device for controlling aspects of energy transfer, power supply and/or charging operations described herein, referred to as a controller 64. The controller 64 may be a separate controller as shown, or part of the control device 56 (e.g., an APM), a battery management system (BMS) controller, the charging control device 60 or a combination thereof. It is noted that embodiments are not limited to any specific controller or processing device, and may encompass multiple processors or control devices.

The vehicle 10 also includes a computer system 66 that includes one or more processing devices 68 and a user interface 70. The computer system 66 may communicate with the charging system controller, for example, to provide commands thereto in response to a user input. The various processing devices, modules and units may communicate with one another via a communication device or system, such as a controller area network (CAN) or transmission control protocol (TCP) bus.

The charging system, the controller 64, the computer system 66 and/or other processing components in the vehicle 10 may be configured to communicate with various remote devices and systems such as charge stations and other vehicles. Such communication can be realized, for example, via a network 72 (e.g., cellular network, cloud, etc.) and/or via wireless communication. For example, the vehicle 10 may communicate with one or more charging stations 74, a remote entity 76 (e.g., a workstation, fleet management system, a computer, a server, a service provider, a technician, an engineer, etc.), and/or another vehicle 78.

In an embodiment, components of the vehicle 10 are configured as part of an energy transfer control system, which includes at least one conversion device configured for partial processing of power flow as described further herein. The conversion device (referred to herein as a "partial power conversion device") is controlled by the controller 64 or other processor(s) to facilitate transfer of energy between two or more mismatched battery systems. The partial power conversion device may be uni-directional or bi-directional, and includes components for partial power processing.

A "battery system" may include a battery pack, module, cell or combination thereof. Examples of battery systems include the battery system 40, the battery pack 44, the battery pack 46, the low voltage battery 54 and any combination thereof. A battery system may be any energy storage device, such as a recipient vehicle battery system (during V2V charging) or any other suitable external energy storage.

Two battery systems are "mismatched" when a characteristic, parameter or property of a first battery system is different than that of a second battery system, such that the voltage across the first battery system (battery voltage) is different when energy transfer is performed. Battery systems may have different chemistries (e.g., Li-ion and NCM), different characteristics such as voltage ratings, different states of charge (SOC), different states of health (SOH) and/or different beginning of life capacities. These differences can result in voltage or energy differences.

A partial power conversion device, also referred to as a partial power processing (PPP) conversion device, is configured to process only a part or fraction of the total power flowing between the two battery systems. In use, only part of the total power or energy flow is processed by a conversion stage (e.g., to adjust voltage), and the remaining part flows through the conversion device without any conversion.

Partial power conversion devices as employed herein process only the amount of power corresponding to a difference between the voltage of two or more parallel connected batteries, or a difference between the voltage of a battery and a common bus. For example, when supplying power to a load from parallel batteries with different chemistries and/or voltages, only the portion of the power corresponding to a difference between the voltages (differential voltage) is processed, so that power is supplied from both batteries at the same voltage. In this way, mismatched batteries can be used to supply power to a load with a higher efficiency than conventional conversion techniques and devices.

As noted above, any suitable controller or combination of controllers may be used to control operation of the partial power conversion device. The amount of power processed by the conversion device (as contrasted with an amount that is bypassed or directly flowed to a load) can be controlled by a controller associated with any battery system.

For example, if the conversion device 58 is used for partial power processing, the conversion device 58 can be controlled by the controller 64, an APM controller or battery management system (BMS) controller. If the vehicle 10 is connected to an external battery (e.g., another vehicle battery system, either directly for V2V charging or in parallel when multiple vehicles are connected to a charging station), a controller associated with any connected external battery may be used to operate the conversion device 58.

Figure 2:
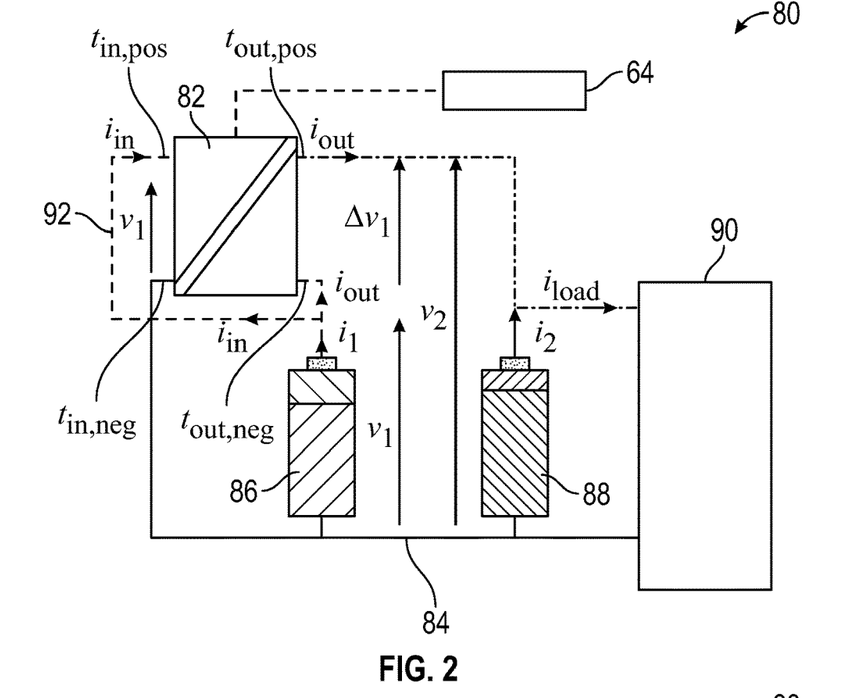
FIG. 2 depicts an energy transfer control system for supplying power from multiple mismatched battery systems, in accordance with an exemplary embodiment.
Figure 3:
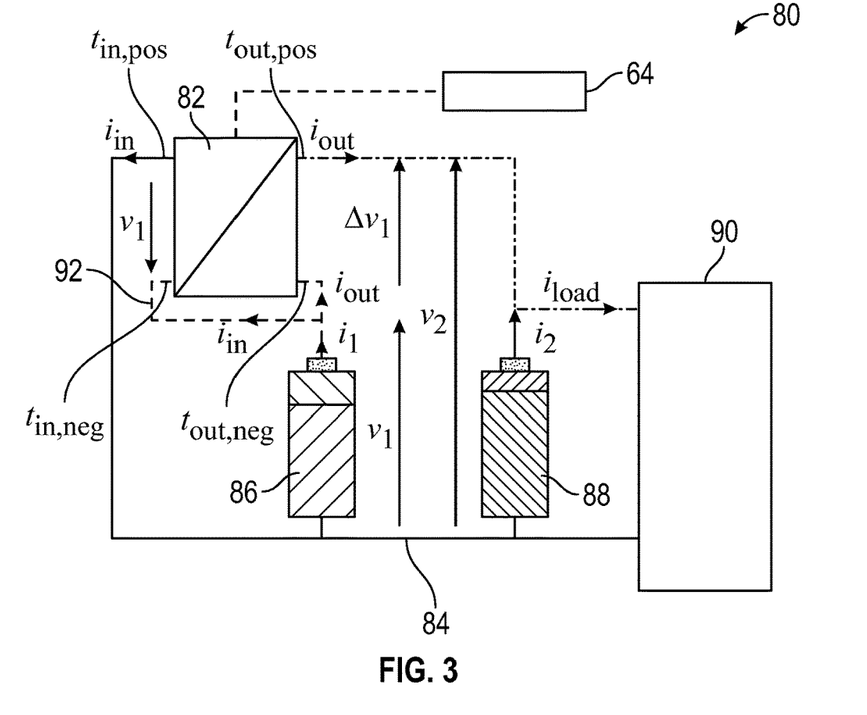
FIG. 3 depicts an energy transfer control system for supplying power from multiple mismatched battery systems, in accordance with an exemplary embodiment.

FIGS. 2 and 3 depict embodiments of a system 80 for controlling energy transfer between mismatched battery systems. The system 80 may be part of a vehicle (e.g., the vehicle 10), or any other suitable device or system. For example, the system 80 may be part of a charging station, a portable charging device or an external load or loads.

The system 80 includes a DC-DC partial power converter 82 (e.g., fractional power converter) connected to a power bus 84. The partial power converter 82 is configured to decouple the voltages of battery systems connected to the power bus 84, and process only the differential voltage (i.e., difference between voltages of the connected battery systems and/or difference between the voltage of a connected battery system and the power bus 84).

The power bus 84 connects a first battery 86 in parallel with a second battery 88, and connects the batteries 86 and 88 to one or more loads, shown as load 90. The first battery 86 is a low voltage battery (e.g., the LV battery 54 of FIG. 1) having a voltage $v_1$, and the second battery 88 is a high voltage battery (e.g., the battery pack 44 of FIG. 1) having a voltage $v_2$. A processor such as the controller 64 controls operation of the partial power converter 82.

The voltages $v_1$ and $v_2$ may be different due to different capacities, chemistries and/or different states of charge (SOC). For example, if the batteries 86 and 88 have different SOCs, the battery voltages are different, as open-circuit (OC) voltage increases as SOC increases. In another example, if the batteries have different chemistries, the OC voltages may be different due to different OC voltage-SOC relationships.

The voltages of various components are represented schematically in FIGS. 2 and 3 (and FIGS. 5 and 6) by labeled vertical arrows. These representations are not intended to limit embodiments to any particular voltage value.

FIG. 2 depicts an embodiment in which the partial power converter 82 is an isolated DC-DC converter, in which the input to the partial power converter 82 is galvanically isolated from the converter output. The partial power converter 82 includes a negative input terminal $t_{in,neg}$, a positive input terminal $t_{in,pos}$, a negative output terminal $t_{out,neg}$, and a positive output terminal $t_{out,pos}$.

In FIG. 2, a negative terminal of the battery 86 is connected to the negative side of the bus 84, and the negative side is connected to the negative input terminal $t_{in,neg}$. A positive terminal of the battery 86 is connected to the negative output terminal $t_{out,neg}$. The negative output terminal $t_{out,neg}$ and the positive terminal of the battery 86 have a series connection 92 to the positive output terminal $t_{in,pos}$.

This series connection 92 allows for partial processing of power P1 from the battery 86, in which the partial power (Pp) generated by the differential voltage (a difference between $v_1$ and $v_2$, referred to as $\Delta v_1$) is processed by the converter 82, while the remaining power (P1−Pp) is transmitted through the series connection 92 at the voltage $v_1$. Total current flow through the converter 82 is denoted $i_1$, current flow through the conversion stages of the converter 82 is denoted as $i_{out}$, and current flow through the series connection 92 is denoted as $i_{in}$. The current supplied to the load 90 is denoted as $i_{load}$, and is a combination of currents $i_{in}$, current $i_{out}$, and an output current $i_2$ from the battery 88.

For example, as shown in FIG. 2, the battery 86 outputs current $i_1$ at the voltage $v_1$. A fixed portion $P_{fixed}$ of the power P1 from the battery 86 flows directly to a load 90. The fixed portion is the portion of the power P1 generated by the battery voltage $v_1$, and can be expressed as:

$$P_{fixed} = i_{out} * v_1.$$

The partial portion (Pp=P1−$P_{fixed}$) can be expressed as:

$$Pp = i_{out} * \Delta v_1.$$

FIG. 3 depicts an embodiment of system 80, in which the partial power converter 82 is a non-isolated converter. The converter 82 in this embodiment includes an inversion stage, and is therefore an inverting non-isolated DC-DC converter.

In this configuration, the terminal of the battery 86 having a highest potential (positive terminal in this embodiment) is connected to an input reference node via the input terminal $t_{in,neg}$, and is also connected to an output reference node via the output terminal $t_{out,neg}$. The terminal of the battery 86 having the lowest potential (negative terminal) is connected to the input terminal $t_{in,pos}$. The output terminal $t_{out,pos}$ is connected to the bus 84.

In an embodiment, the partial power converter 82 (isolated) includes switches with bipolar voltage blocking capability to allow for output of positive or negative voltages. The DC-DC converter output port may be bypassed to provide a direct power path from the battery 86 to the load 90. In other words, the DC-DC converter output voltage $\Delta v_1$ is zero volts.

The energy transfer system 80 may be used in conjunction with supplying power to various loads. For example, the system 80 may be used to provide power to a vehicle propulsion system, other vehicle loads (e.g., power electronics, cooling systems, etc.) and/or external loads such as other vehicle battery systems or storage devices in charging stations (e.g., portable charging stations). In addition, the system 80 may be used for vehicle and battery charging processes.

Figure 4:
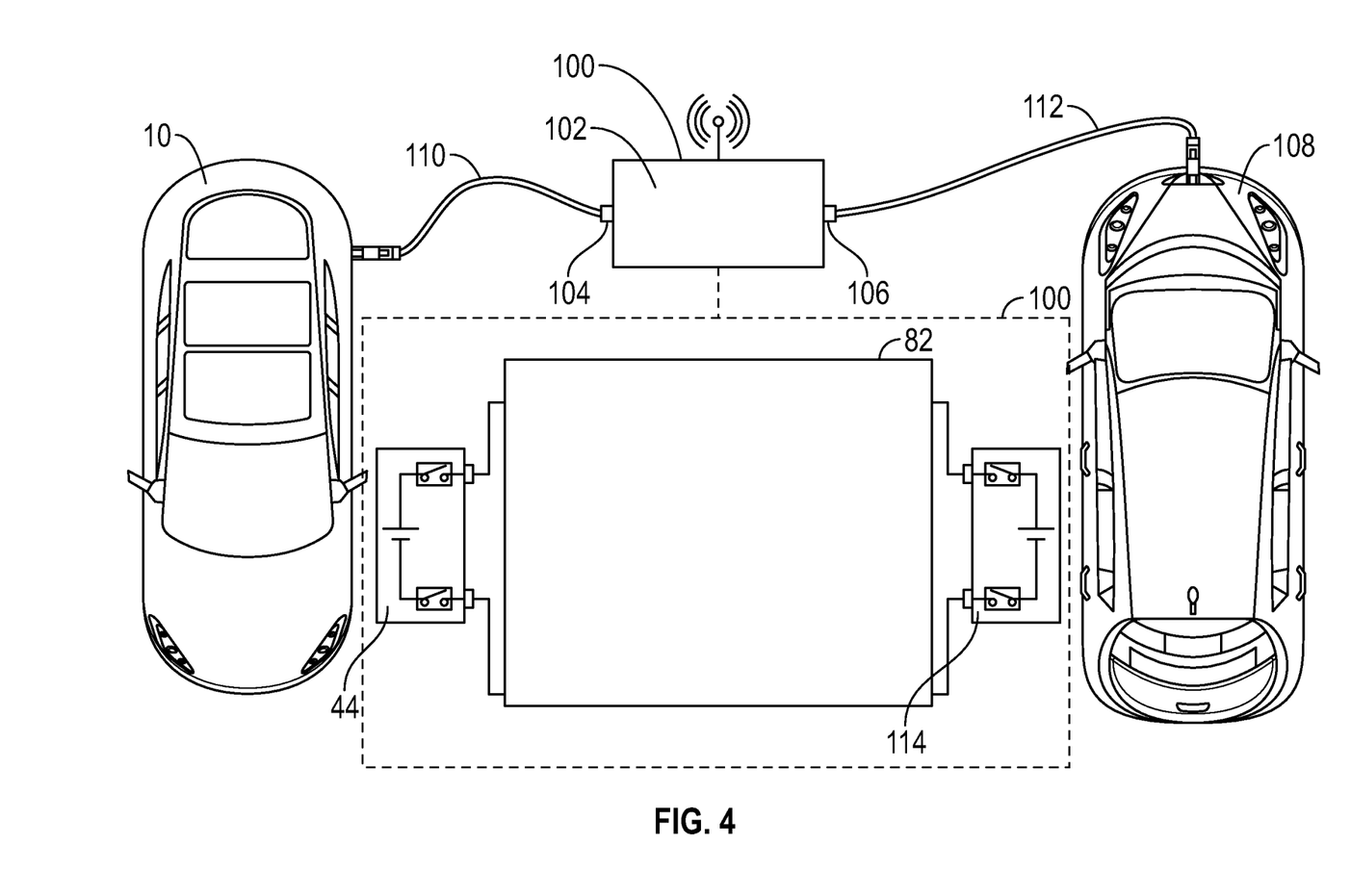
FIG. 4 depicts an energy transfer control system configured as part of a vehicle-to-vehicle (V2V) charging adapter, in accordance with an exemplary embodiment.

FIG. 4 depicts an embodiment of the energy transfer system, in which components of the system are disposed in a portable V2V charger 100. The charger 100 includes a housing 102 with an input port 104 and an output port 106. The partial power converter 82 is disposed in the housing 102 and is controllable to adjust voltage (step up or step down) during charging.

In this embodiment, the vehicle 10 is connected to a recipient vehicle 108 via charge cables 110 and 112. FIG. 4 schematically shows connections between a battery system of the vehicle 10 (e.g., the battery pack 44), the converter 82 and a battery system 114 of the recipient vehicle 114.

The charger 100 may be controlled by any suitable controller, such as a controller in the vehicle 10 or the recipient vehicle 108. In an embodiment, the portable charger 100 is configured to communicate wirelessly with a controller, such as a vehicle controller or a user application (e.g., in a mobile app). The charger 100 as shown is a portable charger that is compact and can be stored in a vehicle.

In use, the charger 100 is controlled during a charging process to convert a voltage of energy provided by the vehicle 10 to a voltage of the recipient vehicle battery system 114. As discussed above, during operation of the conversion device, only a portion of the power provided by the vehicle 10 is processed, thereby reducing losses due to conversion stages and increasing efficiency.

The energy transfer system 80 may include multiple partial power conversion devices, so that multiple separate energy storage systems can be connected in parallel to permit simultaneous charging. For example, multiple vehicles can be connected in parallel to a single power source (providing a single common charging voltage). The respective vehicle battery systems may have different SOCs, chemistries and other parameters, potentially resulting in different voltages. By providing partial processing capability to one or more of the battery systems, efficiency is improved by reducing power loss.

Figure 5:
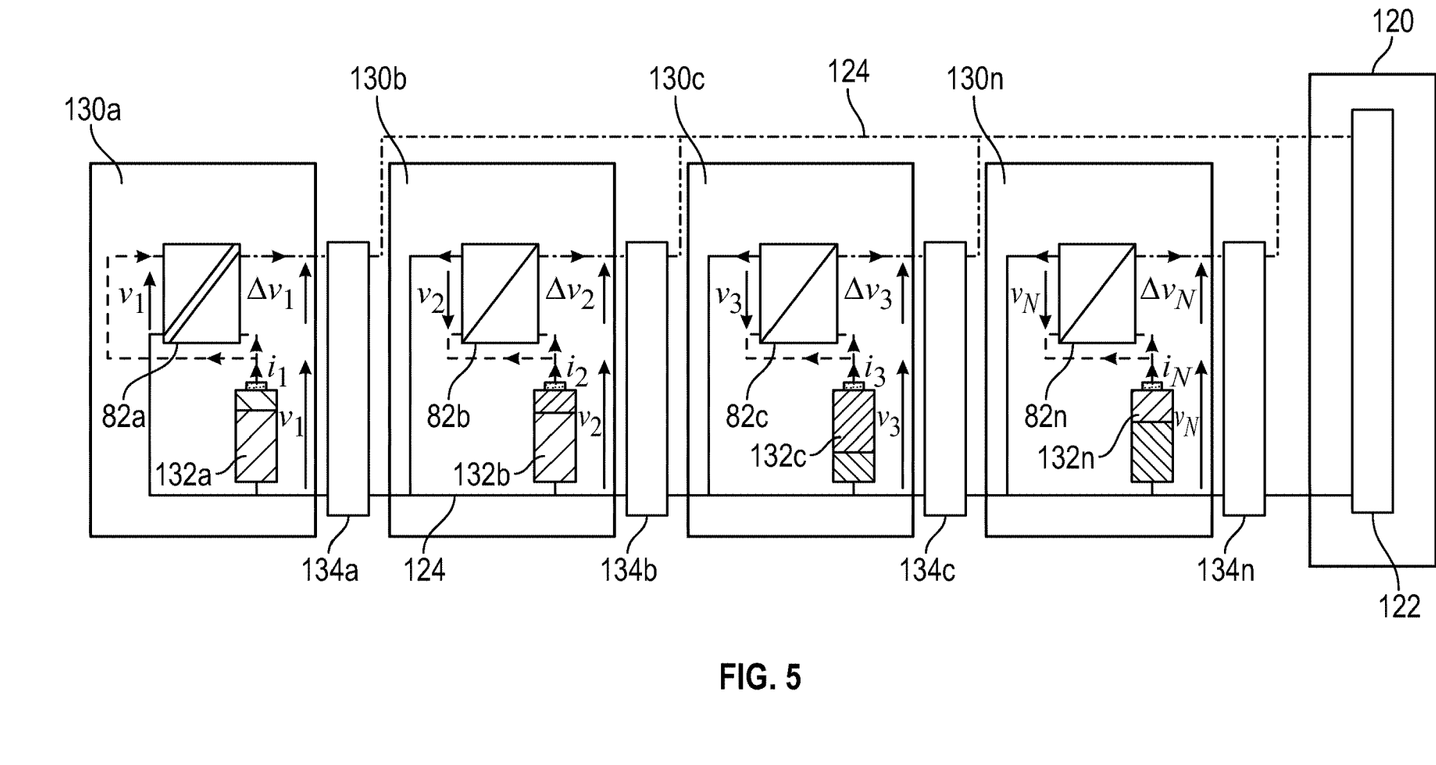
FIG. 5 depicts a charging system for charging multiple vehicle batteries, in accordance with an exemplary embodiment.
Figure 6:
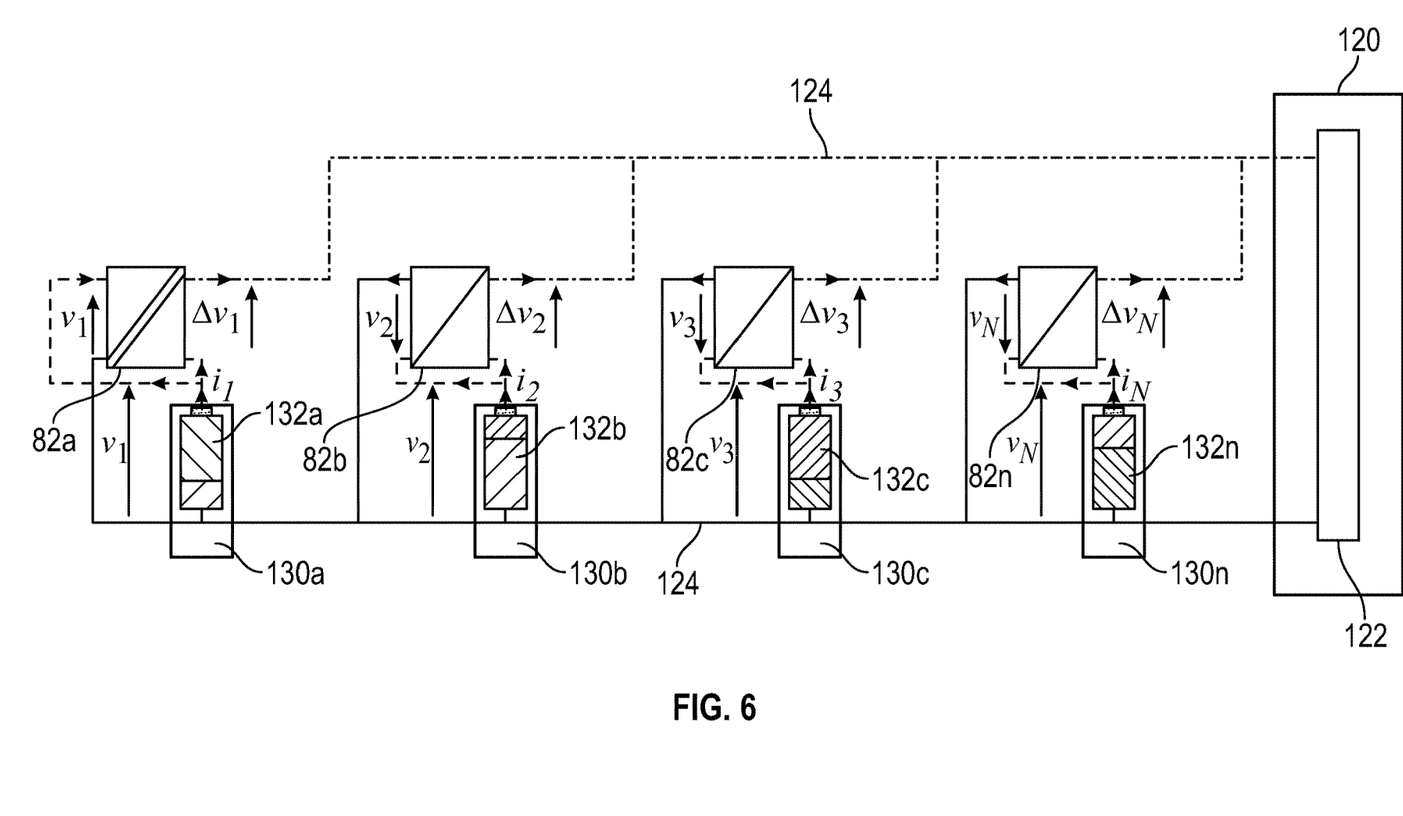
FIG. 6 depicts a charging system for charging multiple vehicle batteries, in accordance with an exemplary embodiment.

FIGS. 5 and 6 depict embodiments of an energy transfer system including multiple partial processing conversion devices for facilitating charging of multiple vehicle batteries simultaneously. In these embodiments, a number of vehicles are connected in parallel to a charging station 120.

The charging station 120 may be a fixed or mobile charging station that has a plurality of output ports connectable to vehicles via charging cables. The charging station 120 includes a common charging bus 122 that connects the vehicles to establish a common DC bus 124 having a voltage $v_{DC}$ corresponding to the charging station's charging voltage.

In FIGS. 5 and 6, a plurality of vehicles 130a, 130b, 130c and 130n are connected to the DC bus 124. It is noted that any number of vehicles may be connected; thus, embodiments are not limited to the number of vehicles and battery systems shown.

The vehicle 130a has a battery system 132a having a voltage $v_1$ and a partial power converter 82a, which are selectively connectable to a vehicle charge port 134a. During a charging process, the battery system 132a outputs a charging current $i_1$. A voltage differential $\Delta v_1$ represents a difference between the voltage $v_1$ and the bus voltage $v_{DC}$.

The vehicle 130b has a battery system 132b having a voltage $v_2$ and a partial power converter 82b selectively connectable to a vehicle charge port 134b. The battery system 132b outputs a charging current $i_2$, and has a voltage differential $\Delta v_2$ with respect to the bus voltage $v_{DC}$.

The vehicle 130c includes a battery system 132c having a voltage $v_3$ and a charging current $i_3$, and a partial power converter 82c selectively connectable to a vehicle charge port 134c. The battery system 132b has a voltage differential $\Delta v_3$ with respect to the bus voltage $v_{DC}$.

The vehicle 130n includes a battery system 132n having a voltage $v_n$ and a charging current $i_n$, and a partial power converter 82n selectively connectable to a vehicle charge port 134n. The battery system 132n has a voltage differential $\Delta v_n$ with respect to the bus voltage $v_{DC}$.

Each battery system may have a different SOC, resulting in a different battery voltage. As a result, each battery system may have a different voltage differential. For example, the battery systems 132a-n each have a different SOC, and thus the voltage differentials are all different.

During charging, each conversion device is controlled by a respective controller to adjust the output voltage of each battery system as needed to match the DC bus voltage. The amount of power Pp that is processed in each conversion device is a function of the difference between the corresponding battery system voltage and the DC bus voltage.

For example, the amount of power processed by the conversion device 82a is based on the differential $\Delta v_1$, and the amount of power processed by the conversion devices 82b, 82c and 83n is based on the differentials $\Delta v_1$, $\Delta v_2$, $\Delta v_3$ and $\Delta v_n$, respectively.

In the embodiment of FIG. 5, the charging station 120 has a common charger (e.g., is a mobile charging station). The converter 82a is an isolated DC-DC converter, and the converters 82b, 82c and 82n are non-isolated DC-DC converters. The common DC bus 24 is managed by the charger 122, and each vehicle has its own conversion device to regulate the charging current in each battery system. Control of charging may be realized via wired or wireless communication between the charging station 120 and each vehicle or vehicle controller. Such communication may include exchange of information such as the charging station voltage, which is used by each vehicle controller to adjust voltage as needed.

In the embodiment of FIG. 6, the charging station 120 includes a conversion device at each charging port of the charging station. Thus, the vehicles do not need to have their own partial processing capability. The converters 82a, 82b, 82c and 82n are non-isolated DC-DC converters.

The charging station 120 in the embodiment of FIG. 6 is responsible for control of each conversion device. For example, a controller in the charging station 120 communicates with each connected vehicle to receive charging information used to manage the various conversion devices, such as maximum current, maximum voltage, maximum temperature and dependence on SOC.

This embodiment may be applicable to various types of charging stations, including fixed stations, mobile stations and battery swapping stations. For example, a battery swapping station may be used to charge removable batteries (e.g., electric scooter or electric bicycle batteries), as each receptacle in the charging station has its own partial processing converter.

Figure 7:
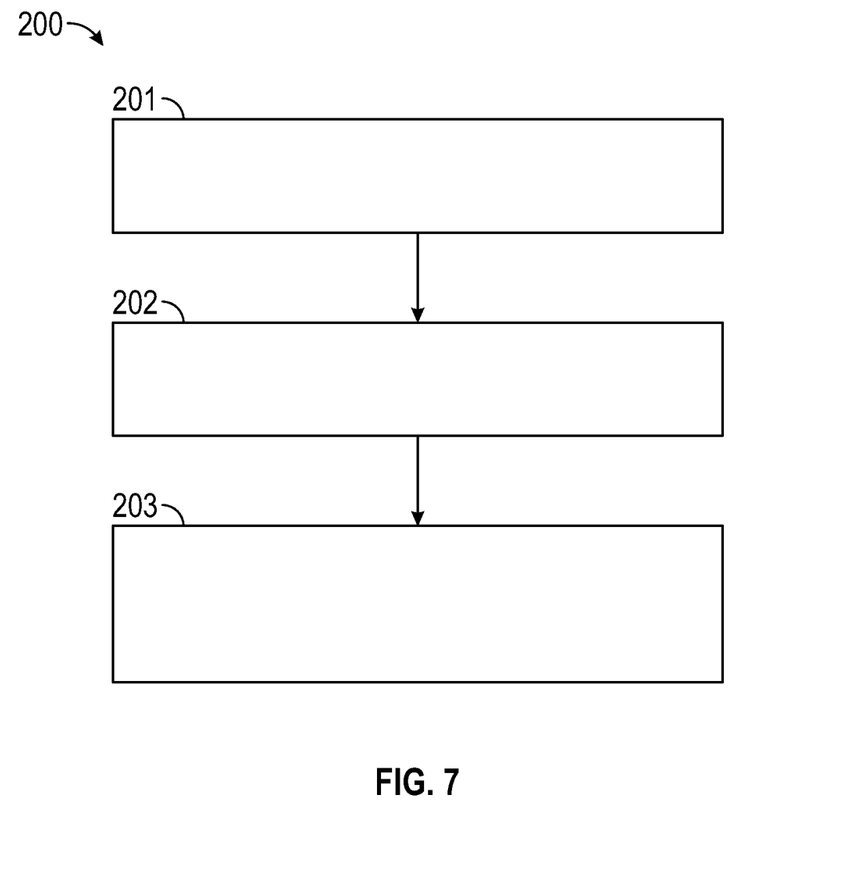
FIG. 7 is a flow diagram depicting aspects of a method of charging a vehicle battery system and/or an external energy storage system, in accordance with an exemplary embodiment.

FIG. 7 illustrates embodiments of a method 200 of controlling energy transfer among multiple energy storage systems. The energy transfer may be performed to supply a load (e.g., motor or vehicle components) and/or charge a battery system.

Aspects of the method 200 may be performed by a processor or combination of processors. For example, if the method is used to supply power to a load from multiple battery systems in a vehicle, one or more controllers in the vehicle may be used. In other examples, such as charging one or more vehicles from a charging station, the method may be performed by a controller in the charging station and/or controller(s) within connected vehicle(s).

It is noted the method 200 is not so limited and may be performed by any suitable processing device or system, or combination of processing devices.

The method 200 includes a number of steps or stages represented by blocks 201-203. The method 200 is not limited to the number or order of steps therein, as some steps represented by blocks 201-203 may be performed in a different order than that described below, or fewer than all of the steps may be performed.

At block 201, a processing device such as the controller 64 receives a request for power transfer among mismatched battery systems. The battery systems may be mismatched in terms of voltage rating, state of charge battery chemistry and/or other parameters. Such a mismatch results in differences between the voltages of the batteries during power transfer.

For example, if the method 200 includes providing power to a propulsion system or load from multiple batteries (e.g., battery systems 86 and 88 of FIGS. 2 and 3), the request may include parameters such as load voltage, current, a vehicle operating mode (e.g., extended range) and others.

The request may be a request to provide power to an external energy storage system, such as another vehicle for V2V charging. In other examples, the request is for charging a vehicle battery system or systems from a charging station.

At block 202, the controller determines various power transfer parameters, such as load requirements and/or charging parameters.

At block 203, the controller 64 operates the partial converter 82 to control the output voltage. The conversion device may be controlled to facilitate providing power from a battery system, or receiving power at a battery system (e.g., from a charging station).

For example, to provide power to the propulsion system 16, the controller 64 of FIG. 2 or 3 controls switching assemblies in the conversion device 82 to step up the voltage from voltage $v_1$ to the higher voltage $v_2$, by controlling the duty cycle of the switching assemblies.

In another example, if the method is used to charge the vehicles 130a-130n from the charging station 120, each vehicle may have its own conversion device, and each conversion device is operated based on the state of charge, voltage and other parameters of a connected battery system. Alternatively, a controller in the charging station 120 controls each conversion device.

Figure 8:
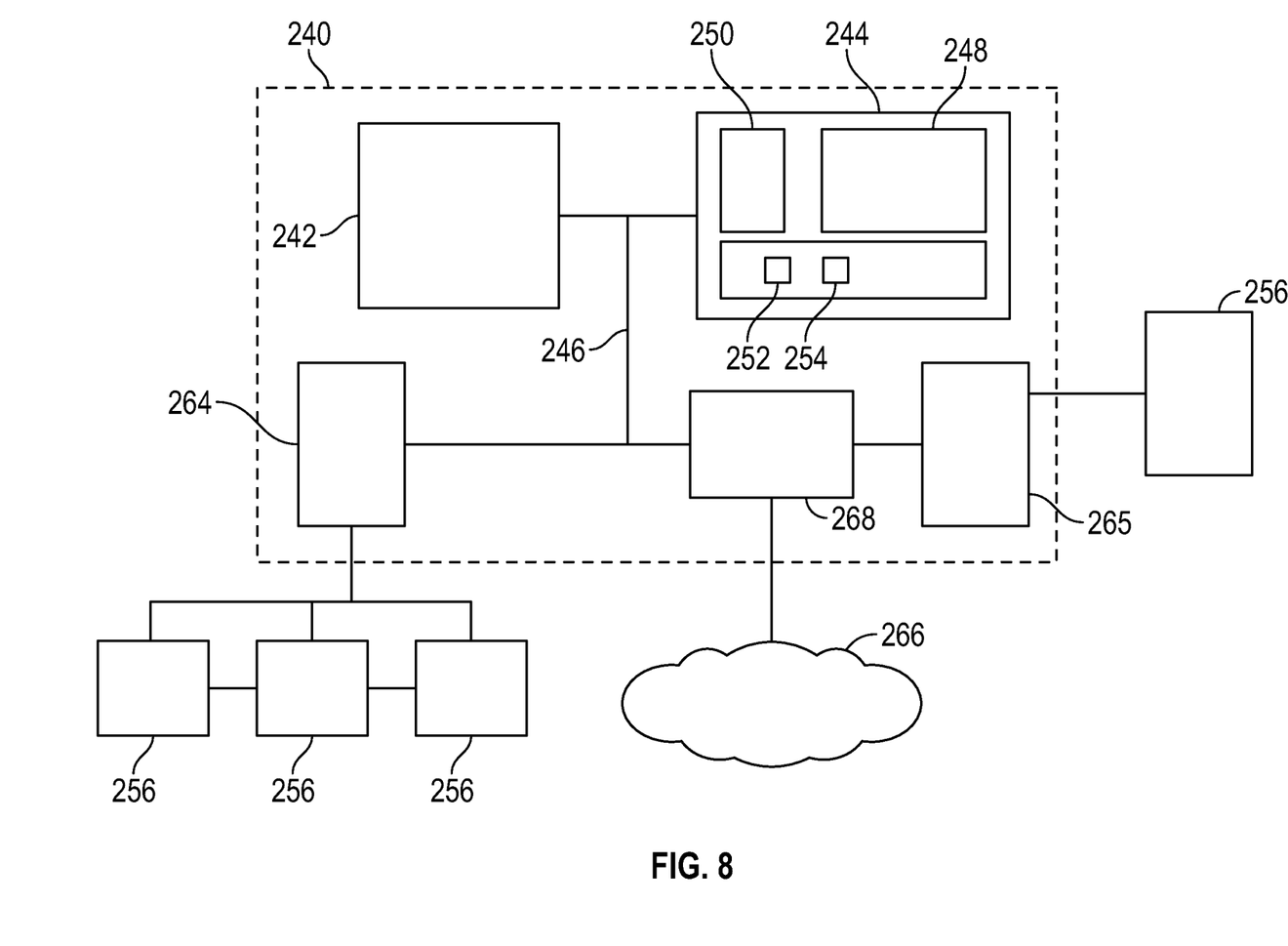
FIG. 8 depicts a computer system in accordance with an exemplary embodiment.

FIG. 8 illustrates aspects of an embodiment of a computer system 240 that can perform various aspects of embodiments described herein. The computer system 240 includes at least one processing device 242, which generally includes one or more processors for performing aspects of image acquisition and analysis methods described herein.

Components of the computer system 240 include the processing device 242 (such as one or more processors or processing units), a memory 244, and a bus 246 that couples various system components including the system memory 244 to the processing device 242. The system memory 244 can be a non-transitory computer-readable medium, and may include a variety of computer system readable media. Such media can be any available media that is accessible by the processing device 242, and includes both volatile and non-volatile media, and removable and non-removable media.

For example, the system memory 244 includes a non-volatile memory 248 such as a hard drive, and may also include a volatile memory 250, such as random access memory (RAM) and/or cache memory. The computer system 240 can further include other removable/non-removable, volatile/non-volatile computer system storage media.

The system memory 244 can include at least one program product having a set (i.e., at least one) of program modules that are configured to carry out functions of the embodiments described herein. For example, the system memory 244 stores various program modules that generally carry out the functions and/or methodologies of embodiments described herein. A module 252 may be included for performing functions related to acquiring signals and data, and a module 254 may be included to perform functions related to control of energy transfer as discussed herein. The system 240 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 242 can also communicate with one or more external devices 256 as a keyboard, a pointing device, and/or any devices (e.g., network card, modem, etc.) that enable the processing device 242 to communicate with one or more other computing devices. Communication with various devices can occur via Input/Output (I/O) interfaces 264 and 265.

The processing device 242 may also communicate with one or more networks 266 such as a local area network (LAN), a general wide area network (WAN), a bus network and/or a public network (e.g., the Internet) via a network adapter 268. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An energy transfer system comprising:
    a conversion device configured to be electrically connected to a first battery system of a first vehicle, the conversion device configured for partial power processing and configured to regulate current from the first battery system; and
    a controller configured to control the conversion device to adjust a first voltage of the first battery system to conform the first voltage to a second voltage of a second battery system, the second battery system connected in parallel with the first battery system by a bus, the conversion device configured to:
        receive power from the first battery system;
        cause a selected portion of the power to flow through a conversion stage to adjust the first voltage, the selected portion corresponding to a difference between the first voltage and the second voltage;
        cause a remaining portion of the power to flow directly to the bus and bypass the conversion stage; and
        output a current from the conversion device at the second voltage.

2. The system of claim 1, wherein the conversion device is an isolated DC-DC converter.

3. The system of claim 1, wherein the conversion device is a non-isolated inverting DC-DC converter.

4. The system of claim 1, wherein the conversion device includes a DC-DC converter configured to provide a variable voltage to an inverter for control of an electric motor of the first vehicle.

5. The system of claim 1, wherein the conversion device is disposed in a portable adapter configured to be connected to the first vehicle and a recipient vehicle for vehicle-to-vehicle (V2V) charging.

6. The system of claim 1, wherein the second battery system is a power source of a vehicle charging system, the vehicle charging system including a common charging bus that is configured to connect multiple vehicles in parallel to the power source to simultaneously charge the multiple vehicles.

7. The system of claim 6, wherein the conversion device is disposed in the first vehicle and is configured to be connected to the vehicle charging system via a charge port.

8. The system of claim 6, wherein the conversion device includes a plurality of conversion devices, each of the plurality of conversion devices disposed in a respective charging port of the charging system.

9. A method of control of energy transfer, comprising:
    connecting a first battery system of a first vehicle to a load or an energy storage system, the first battery system electrically connected to a conversion device configured for partial power processing and configured to regulate current from the first battery system, the first battery system connected in parallel with a second battery system to a bus; and
    controlling the conversion device to adjust a first voltage of the first battery system to conform the first voltage to a second voltage of the second battery system, the controlling including:
        receiving power from the first battery system;
        causing a selected portion of the power to flow through a conversion stage to adjust the first voltage, the selected portion corresponding to a difference between the first voltage and the second voltage;
        causing a remaining portion of the power to flow directly to the bus and bypass the conversion stage; and
        outputting a current from the conversion device at the second voltage.

10. The method of claim 9, wherein the conversion device is an isolated DC-DC converter or a non-isolated inverting DC-DC converter.

11. The method of claim 9, wherein the conversion device includes a DC-DC converter configured to provide a variable voltage to an inverter for control of an electric motor of the first vehicle.

12. The method of claim 9, wherein the conversion device is disposed in a portable adapter connected to the first vehicle and a recipient vehicle for vehicle-to-vehicle (V2V) charging, and the second voltage is a voltage of a recipient battery system of the recipient vehicle.

13. The method of claim 9, wherein the second battery system is a power source of a vehicle charging system, the vehicle charging system including a common charging bus that is configured to connect multiple vehicles in parallel to the power source to simultaneously charge the multiple vehicles.

14. The method of claim 13, wherein the conversion device is disposed in the first vehicle and is connected to the vehicle charging system via a charge port.

15. The method of claim 13, wherein the conversion device includes a plurality of conversion devices, each of the plurality of conversion devices disposed in a respective charging port of the vehicle charging system.

16. A vehicle system, comprising:
    a first battery system of a first vehicle;
    a conversion device electrically connected to the first battery system, the conversion device configured for partial power processing and configured to regulate current from the first battery system, the first battery system connected in parallel with a second battery system to a bus; and
    a controller configured to control the conversion device to adjust a first voltage of the first battery system to conform the first voltage to a second voltage of the second battery system, wherein the control of the conversion device includes:

receiving power from the first battery system;
causing a selected portion of the power to flow through a conversion stage to adjust the first voltage, the selected portion corresponding to a difference between the first voltage and the second voltage;
causing a remaining portion of the power to flow directly to the bus and bypass the conversion stage; and
outputting a current from the conversion device at the second voltage.

17. The vehicle system of claim 16, wherein the conversion device is an isolated DC-DC converter or a non-isolated inverting DC-DC converter.

18. The vehicle system of claim 16, wherein the conversion device includes a DC-DC converter configured to provide a variable voltage to an inverter for control of an electric motor of the first vehicle.

19. The vehicle system of claim 16, wherein the conversion device is disposed in a portable adapter connected to the first vehicle and a recipient vehicle for vehicle-to-vehicle (V2V) charging, and the second voltage is a voltage of a recipient battery system of the recipient vehicle.

20. The vehicle system of claim 16, wherein the second battery system is a power source of a vehicle charging system, the vehicle charging system including a common charging bus that is configured to connect multiple vehicles in parallel to the power source to simultaneously charge the multiple vehicles.

* * * * *